United States Patent [19]

Desmarais

[11] Patent Number: 5,394,945
[45] Date of Patent: Mar. 7, 1995

[54] PRECISION WEEDING MACHINE FOR ROW CROPS

[76] Inventor: Robert Desmarais, 129 Route 116, Acton Vale, Quebec, Canada, J0H 1A0

[21] Appl. No.: 46,574

[22] Filed: Apr. 16, 1993

[51] Int. Cl.⁶ .................... A01B 63/14; A01B 49/04
[52] U.S. Cl. ............................ 172/98; 172/138; 172/387; 172/476; 172/478; 172/667; 172/645; 172/655; 111/127
[58] Field of Search .............. 172/98, 233, 26, 5, 172/6, 138, 387, 315, 388, 317, 431, 476, 980, 668, 667, 645, 646, 655; 47/57.5, 1, 42; 111/127

[56] References Cited

U.S. PATENT DOCUMENTS

| | | | |
|---|---|---|---|
| 2,533,129 | 12/1950 | Martin | 172/431 |
| 2,635,367 | 4/1953 | Piel et al. | 172/388 |
| 3,076,511 | 2/1963 | Johnson | 172/387 |
| 3,208,535 | 9/1965 | Fischer | 172/667 |
| 3,841,413 | 10/1974 | Applewhite | 172/476 |
| 4,183,413 | 1/1980 | Boston | 172/646 |
| 4,391,051 | 7/1983 | Bächler | 172/387 |
| 4,520,876 | 6/1985 | Peterson et al. | 172/26 |
| 4,616,712 | 10/1986 | Jorgensen | 172/6 |
| 5,259,460 | 11/1993 | Evars | 172/574 |

*Primary Examiner*—Dennis L. Taylor
*Assistant Examiner*—Spencer Warnick
*Attorney, Agent, or Firm*—Pierre Lespérance; Francois Martineau

[57] ABSTRACT

The machine includes a frame adapted to move along spaced ridges planted with crop plants, frame support runners engaging the furrows between the ridges, a pair of transverse rows of weeding implements carried by the frame for movement along the ridges and furrows, the implements of one row disposed on one side of the plants and the implements of the other row disposed on the other side of the plants. Each row is transversely displaceable by a double acting hydraulic ram relative to the frame. The rams are controlled by an operator supported by the frame in a position to have a direct view of the weeding implements. Each implement is free to move up and down independently of the remaining implements in order to follow the ground contour. The implements of any one row can be raised together out of working position. These weeding implements can be earth working discs and/or thermal weeders. Each thermal weeder consists of an idle wheel having a rim formed by two spaced marginal portions rotating on the ridge on each side of the crop plants and of propane gas burner nozzles directed towards the ground on the outside of the marginal portions, the latter protecting the plants. The two marginal portions can be adjustably spaced in accordance with the size of the crop plants. For combustible black soil rich in organic matter, the wheel marginal portions have outwardly directed ground contacting cylindrical flanges interposed between the flame and the soil.

13 Claims, 6 Drawing Sheets

PRECISION WEEDING MACHINE FOR ROW CROPS

FIELD OF THE INVENTION

The present invention relates to agricultural machines and, more particularly, to a machines for working row crops such as weeding.

BACKGROUND OF THE INVENTION

In row crop cultivation, it is necessary to remove weeds on each side of and as close as possible to the crop plants. Therefore, the weeding machines use a guidance system, for instance runners, running in a ground trace, for instance in a furrow, for laterally guiding the earth working implements. Such known guidance systems are often not precise enough, for instance in the case of carrots cultivation wherein it is necessary to weed lateral zones which are very close to the planted carrots otherwise the weeds will overwhelm the young plants.

Weeding is currently effected either by mechanical means such as discs or the like tools or by a thermal system using burners emitting a flame directed against the weeds on each side of the crop plants. In order to protect the plants against the heat, baffle plates run in the soil on each side of the plants, these baffle plates often uproot the plants since they disturb the soil.

OBJECTS OF THE INVENTION

It is therefore the general object of the present invention to provide an agricultural machine for row crop cultivation having means for treating the earth at a very close distance to the planted crops for effecting, for instance, precision weeding.

Another of the present invention is to provide a thermal weeding system in which the weeds on each side of and very close to the plants can be burned off without disturbing the soil around the plants and thus disturbing the plants themselves.

Another object of the present invention is to provide a machine with precision guidance as above described which is particularly adapted for crops planted on equally spaced ridges with intervening furrows.

SUMMARY OF THE INVENTION

The row crop machine of the invention includes a frame which may be self propelled or hitched to a farm tractor for movement in a longitudinal direction, earth engaging frame support members depending from the frame and preventing movement of the frame transversely of said longitudinal direction, a transverse row of earth working implements carried by the frame for movement in said longitudinal direction and also transversely displaceable relative to the frame in opposite transverse directions and actuator means reacting on the frame and acting on the implements to move the row of implements in either one of said transverse directions. The actuator means are under the control of an operator who has a direct vision of the ground and, consequently of the crop plants. Therefore, he can laterally adjust the working implements as the machine moves along so as to treat or work the soil very close to the crop plants during weeding. The adjustment can be very rapidly made to suit the type and age of the crop plants being weeded. The frame support members are either runners or tire wheels which are used for guiding the machine along ground traces such as furrows. Preferably runners and tire wheels are used; the latter are lifted during work and are lowered to raise the runners off the ground when the machine is not working. The earth working implements can be in the form of inclined discs arranged in at least two rows, the discs of one row being inclined in opposite direction with respect to the disc of the other row, the stroke of the transverse movements of the rows of disc being at least equal to half the distance between two adjacent implements so that the transverse position of the discs of the two rows may be reversed to either effect weeding by earth removing along each side of the plants or effect earth refilling of the ridges on each side of the plants.

A thermal weeding system is also provided wherein a ground engaging idle wheel including two spaced marginal portions, is rotated with said portion on each side of the row of the crop plants and flames are directed on the two lateral zones on the outside of the wheel very close to the plants while the plants are protected from the flame and the soil adjacent the plants is not disturbed by the wheel passage. Deflector plates are preferably disposed ahead of the wheel to guide the plants within the space between two marginal portions of the wheel.

DETAILED DESCRIPTION OF THE PREFERRED EMBODIMENTS

Figure 1:
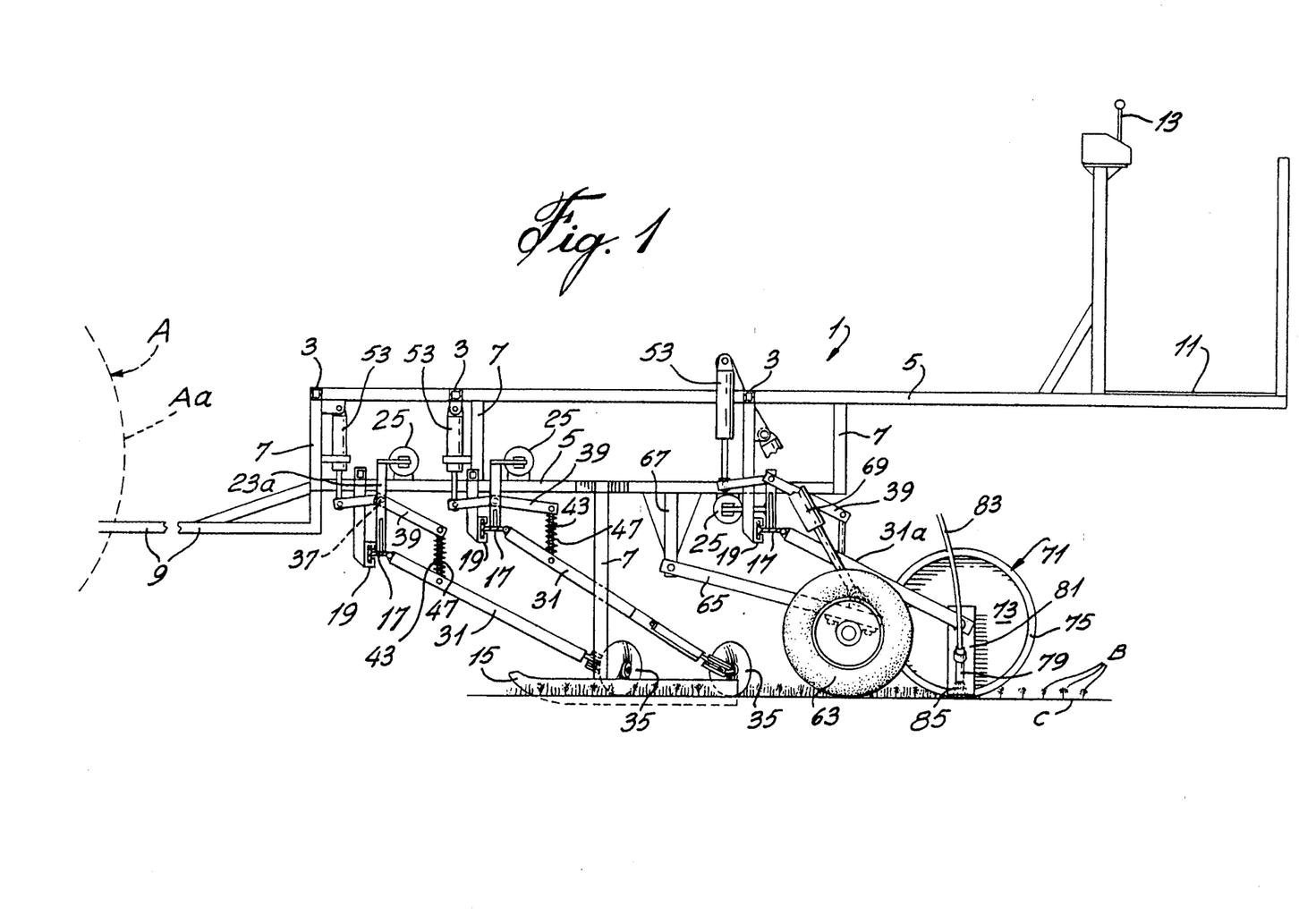
FIG. 1 is a side elevation of the first embodiment of the machine.
Figure 2:
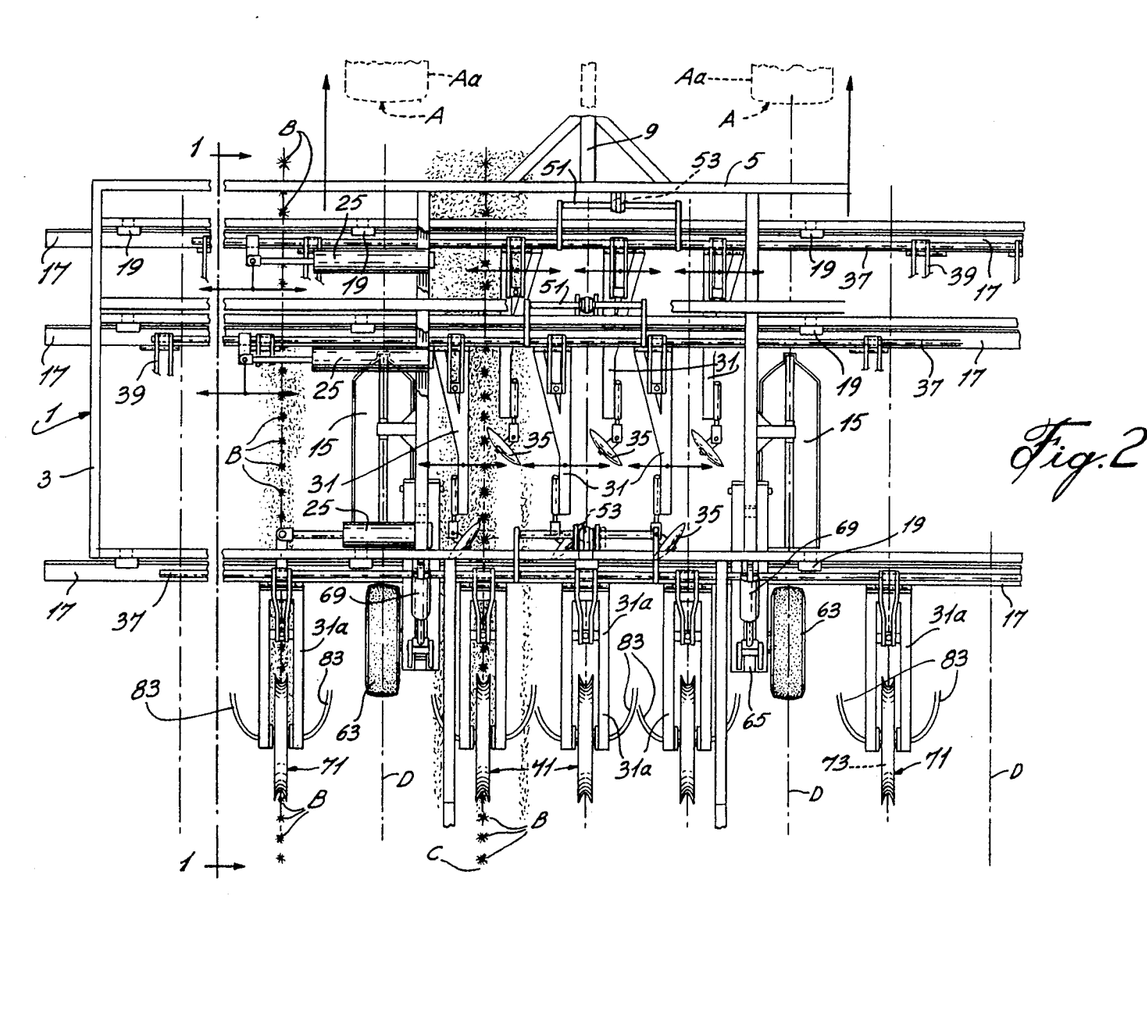
FIG. 2 is a top plan view of the same.
Figure 3:
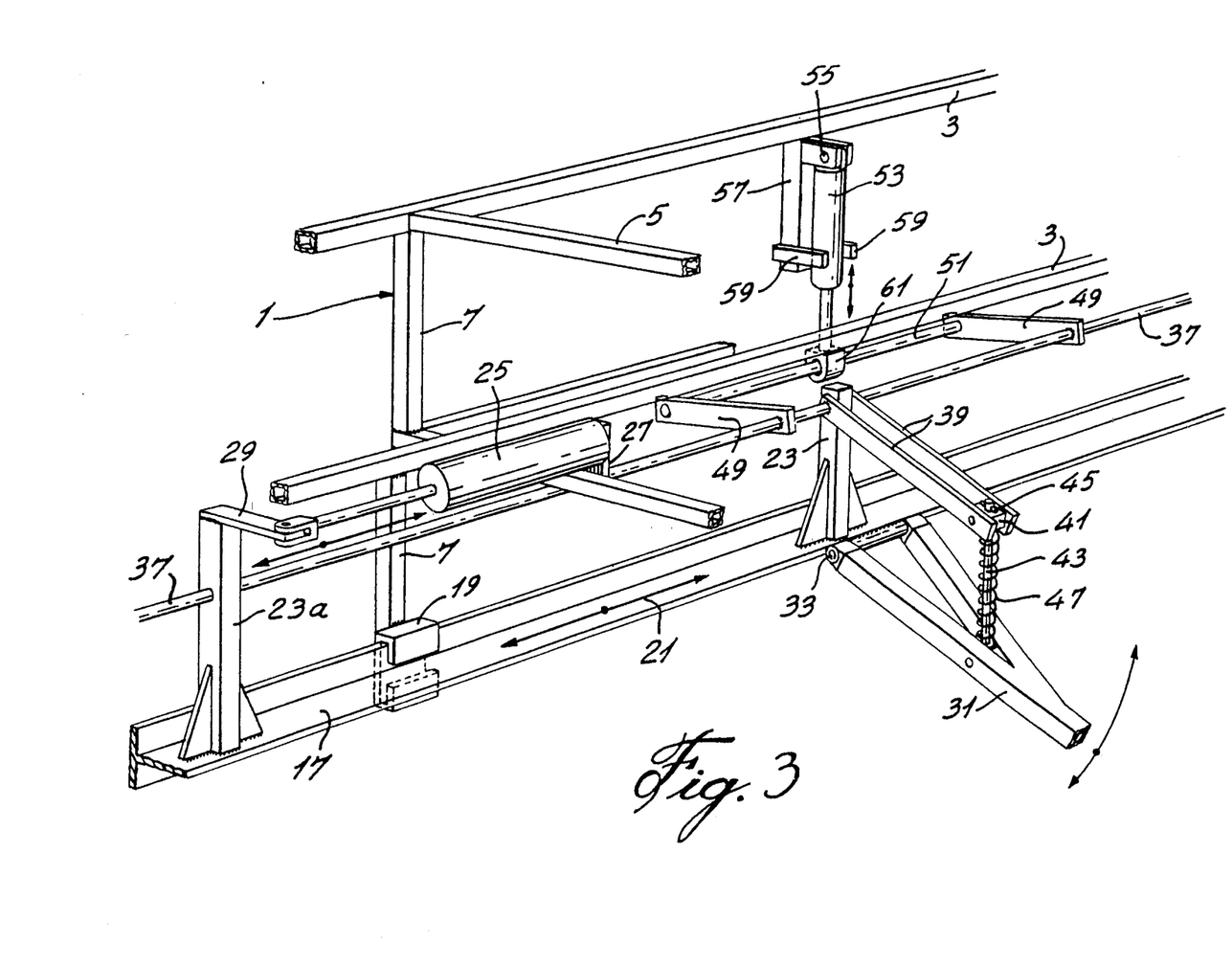
FIG. 3 is a partial perspective view of the first embodiment.

Referring to FIGS. 1, 2, and 3, there is shown the preferred embodiment of the invention which comprises a frame 1 formed of transverse tubular members 2, longitudinal tubular members 3 and vertical tubular members 4, all welded to one another. Frame 1 has at its front a hitching bar 5 adapted to be hitched to, for instance, a farm tractor A for pulling of the machine while allowing pivotal movement in all planes. The back of frame 1 defines an operator's station 11 who may be standing or seated and who has access to the hydraulic control levers 13 for laterally displacing in either direction, the soil working implements as will be described hereinafter while having a direct view on the crop plants B planted in, generally, equally spaced rows on ridges C formed in the soil and separated by intervening furrows D.

Frame 1 generally extends transversely of several ridges C, for instance, nine such ridges. The frame 1 is supported on the ground by two laterally spaced runners 15 engaging and guided within the same furrows in which the rear wheels Aa of the farm tractor A travels. Runners 15 are of conventional construction and are designed to follow a trace at the bottom of the furrows so as to guide the machine in the same path as that effected by the same machine or a similar one when the seeding operation was effected. Runners 15 are fixed to the frame 1 and, therefore, positively guide the frame 1 against lateral displacement.

Three transverse tool bars drag members 17 are slidably mounted within respective guide members 19 which are fixed to the frame 1 at the lower end of vertical members 7. There are at least two guide members 19 for each tool bar 17 and the three tool bars are parallel to each other and can be displaced transversely of the machine in either direction in accordance with arrow 21 in FIG. 3. To each tool bar 17 is fixed a series of upstanding posts 23 and a post 23a. A double-acting hydraulic cylinder and piston unit or ram 25 extends transversely of the frame 1 having one end attached to a longitudinal member 5 of frame 1 by a plate 27 while the other end of the ram is attached to the top of post 23a through an arm 29 fixed to said post.

Tool bar 17 has a T-shape cross-section, its vertical flange engaged in the guide members 19 and its horizontal flange protruding rearwardly therefrom. A plurality of equally spaced swing arms 31 extend rearwardly from each tool bar 17 being provided at their forward end with a hinge 33 having a central tubular part welded to the edge of the horizontal flange of tool bar 17. The hinge 33 allows vertical up and down pivotal movement of the swing arm 31.

The rear end of each swing arm 31 carries an earth working implement; in the particular example shown, the implement is a disc 35 which can be adjustably set at the desired vertical or horizontal inclination with respect to the swing arm 31. Each swing arm 31 is pivoted to tool bar 17 in register with a post 23.

A rotatable rod 37, which may have a circular or non-circular cross-section, extends parallel to and above the tool bar 17, being rotatably carried within the posts 23 and 23a. A pair of lifting crank arm 39 are fixed to rod 37 on each side of each post 23 and extends over swing arm 31 to be connected thereto by means of a block 41 and a link rod 43. Block 41 is pivoted at the outer end of the lifting crank arms 39 being disposed between the same while link rod 43 is pivoted at its lower end to the swing arm while its upper end is free to slide within a hole of block 41 being retained by a transverse pin 45. A compression spring 47 surrounds the link rod and bears against the pivotal connection of the same to the swing arm and against the underside of block 41.

A pair of transversely spaced actuating crank arms 49 are fixed to the rotatable rod 37, extend forwardly the same and their outer ends are interconnected by an actuator rod 51 parallel to rotatable rod 37. A vertically disposed double-acting hydraulic ram 53 has its cylinder pivoted at 55 to frame portion 57 which carries guides 59 extending on each side of the ram cylinder to guide the same in its pivotal movement. The piston rod of the ram 53 carries a collar 61 which surrounds the actuating rod 51, the latter is free to slide in collar 61.

Downward action of vertical ram 53 will rotate rotatable rod 37 so as to cause lifting crank arms 39 to raise all the swing arms 31 of a given row to an approximately horizontal position so as to raise the discs 35 in a non-working position. When the crank arms 39 are in lowered position the discs 35 are in working relation with the soil being pressed downwardly by the compressing springs 47. However, the discs 35 are free to move up and down to follow the ground contour.

Each of the two transverse rows of discs 35 may be moved transversely of the machine independently of the other row by its own horizontal hydraulic ram 25 which acts directly on the tool bar 17 to which are attached all the swing arms 31 of the same row. This horizontal transverse movement is allowed by the vertical ram 53 since its collar 61 simply let actuator rod 51 to slide through the same.

Preferably, the stroke effected by the two tool bar 17 is at least equal to the transverse distance between two adjacent discs 35. Therefore, discs 35 can be moved through the extent of half the distance between two adjacent ridges C. In this manner, the discs 35 can be used either for weeding or for ridge refilling purposes. In the position of the rows of discs shown in FIG. 2, the discs serve to effect mechanical weeding of the ridges C on each side of the plants B. More particularly, the discs of the foremost row are inclined and disposed on one side of the plants B so as to displace the earth laterally away from the plants and dig up the weeds. The discs of the second row are inclined in opposite direction and are located on the other side of the plant. By laterally shifting the discs of the first row to the left of the plants while laterally shifting the discs of the second row to the right of the plants, the discs are now in a position for ridge refilling. This change of operation is effected without having adjust the inclination of the discs with respect to their respective swing arms 31. Therefore, in a first pass of the machine, weeding can be effected while ridge refilling can be effected in a subsequent pass over the same row of crop plants B. In each pass, the operator at station 11 can control, by means of the levers 13, laterally shifting the discs 35 while the machine is being pulled by the tractor so as to precisely position the discs 35 with respect to the plants B in either weeding position or ridge refilling position so as to effect weeding or earth refilling very close to the crop plants despite lateral deviations of the plants and ridges with respect to the furrows D in which the runners 15 ride.

It will be noted that the reaction force produced by transverse shifting of the discs 35 is resisted by the runners 15 engaging the bottom of the furrows D.

The frame 1 can also be supported by a pair of ground engaging tire wheels 63 which are longitudinally aligned with the respective runners 15. Each tire wheel 63 is carried at the outer end of a trailing swing arm 65 which is pivoted at its front end to a bracket 67 depending from longitudinal members 5 of frame 1.

Hydraulic rams 69 are pivoted to the outer ends of swing arms 65 and to the frame 1 and serve to raise and lower the tire wheels 63 above and below the level of the runners 15. Preferably, when the machine is in working position, the tire wheels 63 are raised off the ground and when the machine is not working the tire wheels 63 are lowered to raise the runners 15 off the ground. When the machine is not working, the working implements or discs 35 are also raised off the ground.

It is noted that the runners 15 are not essential since the tire wheels 63 could be used while the machine is working to guide the same in the furrows D in register with the tire wheels A of the farm tractor.

The inclination of the discs 35 can be horizontally adjusted to remove the desired amount of soil. The discs can also be vertically adjusted on the swing arms in accordance with the size and type of crop plants in order to prevent cutting the leaves of such plants. Other types of earth working implements can be carried by the swing arms 31 such as spikes, hoes and the like, depending on the type of crop plants.

The machine shown also carries a thermal weeding system which is generally indicated at 71 and which burns weeds on each side and very close to the crop plants B. The thermal weeding system 71 can be used instead of the mechanical weeding discs system such as 35 or together with the same in the same pass of the machine. The thermal weeding system 71 can weed still much closer to the plants than the discs 35 and this also despite lateral deviations of the plants B with respect to the trajectory of the frame 1.

Thermal weeding system 71 includes several plant protecting idle wheels 73, each mounted for free rotation at the trailing end of a swing arm 31A similar to the swing arm 31 and pivotally connected at its forward end to a tool bar 17 mounted for transverse displacement with respect to frame 1 in the same manner as the tool bars 17 controlling the discs 35. The idle wheels 73 can thus be laterally shifted with respect to frame 1 under the control of its hydraulic ram 25. Also the idle wheels 73 can be raised off the ground by a lifting system including the lifting crank arms 39, rotatable rod 37 and vertical hydraulic ram 53. The wheels 73, in their operative position are allowed to just rest on the soil and are made as light as possible, therefore the compression springs 47 associated with the discs 35 are not necessary for the idle wheels 73.

Figures 5, 6:
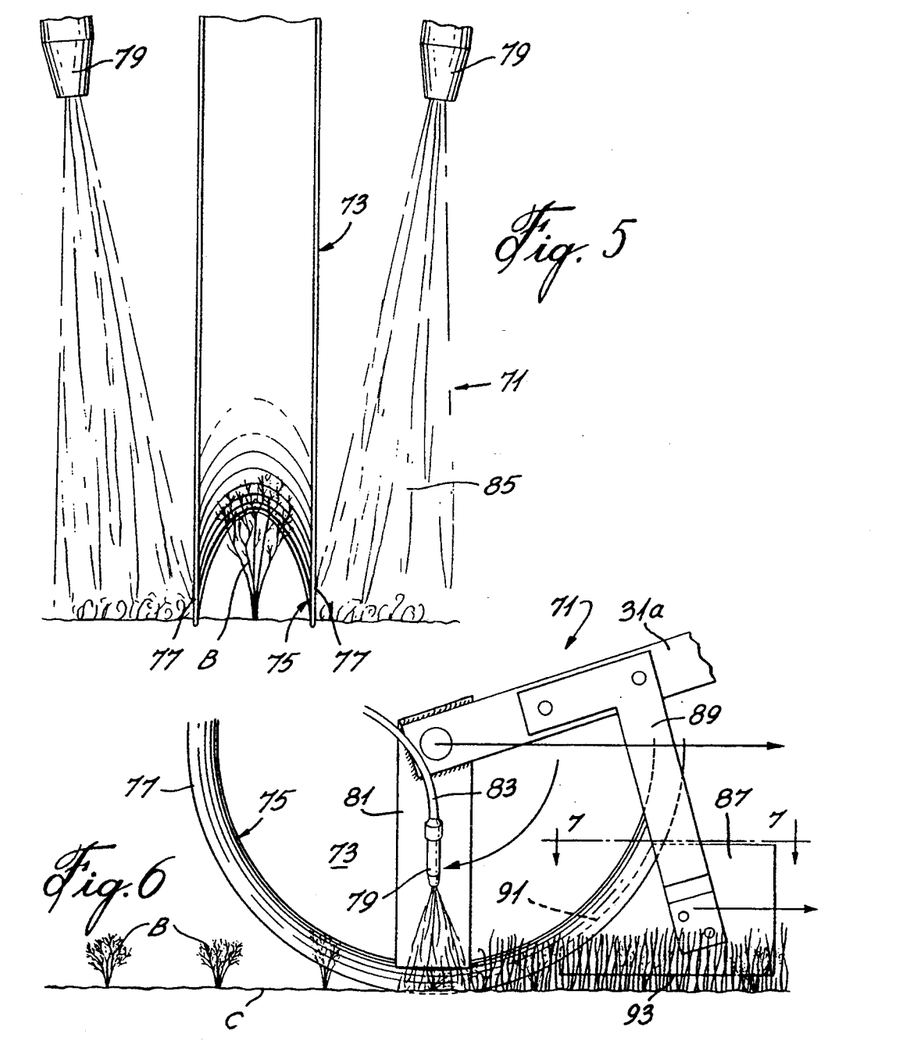
FIG. 5 is a partial front elevation of the thermal weeder.
FIG. 6 is a partial side elevation of the weeder of FIG. 5.
Figure 7:
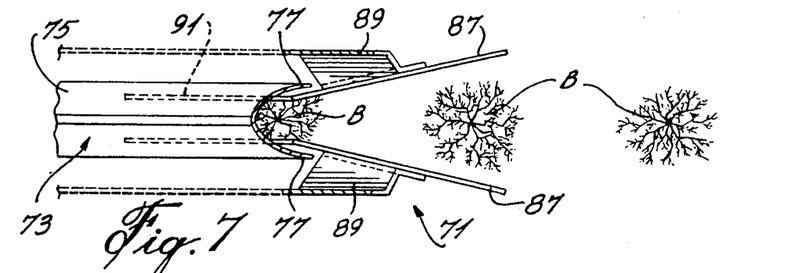
FIG. 7 is a partial plan section taken along line 7—7 of FIG. 6.

Referring to FIGS. 5, 6, and 7, each idle wheel 73 is in the form of a bicycle wheel without the tire and air chamber, defining a rim 75 of transversely U-shape cross-section, forming an outwardly opening plant receiving groove. Therefore, the rim 75 forms two transversely spaced circular peripheral portions 77 which are adapted to run on each side of the crop plants B, while lightly resting on the ground, the wheel freely rotating. Thus, the soil is hardly disturbed. The plants may be slightly compressed by the wheel but will spring back to their original position.

Burner nozzles 79 are fixed on each side of the wheel 73 to the swing arm 31A by means of bracket plates 81. These nozzles are downwardly directed and are supplied by hoses 83 with combustible gas such as propane under pressure contained in bottles (not shown). The flame 85 emitted by the burner nozzles 79 is downwardly directed on each side of the wheel and burns the weeds which might otherwise overwhelm the young crop plants protected by the wheels 73. The wheels 73 are laterally shifted by the operator at station 11 so as to exactly follow the rows of plants B to be protected. In this manner, the weeds can be burned very close to the young plants without damaging the same by the heat.

Preferably, a pair of forwardly diverging or flaring deflector plats 87 are carried by the brackets 81 through L-shaped arms 89 ahead of the wheel 73 with their rear end 91 extending between the two marginal portions 77 as shown in FIGS. 6 and 7. Therefore, the deflector plates 87 press the plant leaves to engage the wheel space between the two marginal portions 77. The lower edges 93 of deflector plates 87 are spaced above ground so as not to disturb the same.

Figure 8:
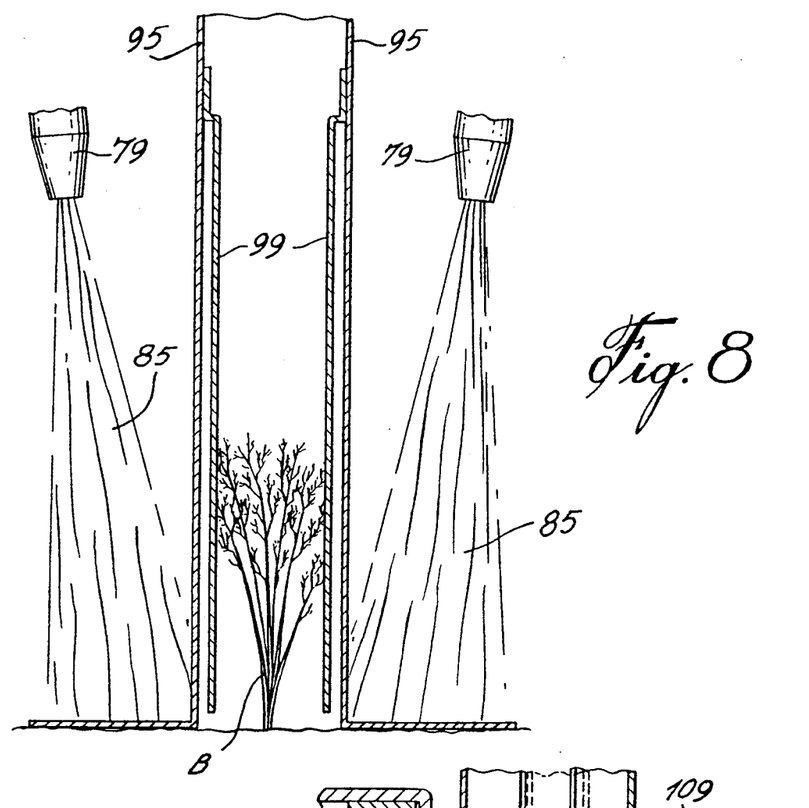
FIG. 8 is a cross-section of a modified thermal weeder.

FIG. 8 shows another embodiment of the protector wheel, and including two spaced discs 95, each provided at its outer edge with an outwardly directed cylindrical flange 97 on which the flame from the burner nozzles 79 is directed. These flanges 97 are heated to a high temperature and burn the weeds. Each disc 95 is provided on the inside with an annular heat shield 99 to further protect the plants against the heat. This embodiment is intended to be used over black soil which is very rich in organic matter and which might catch fire when exposed to a direct flame.

Figure 9:
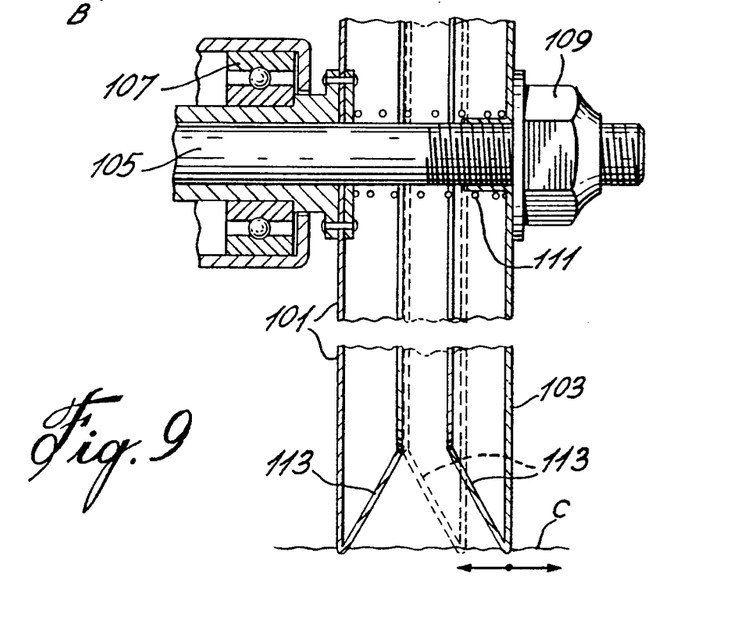
FIG. 9 is a partial cross-section of yet another embodiment of the thermal weeder.

FIG. 9 shows another embodiment of a plant protector idle wheel indicated at 73b and which is used for bigger crop plants. This embodiment is characterized by the fact that two discs 101, 103 are mounted on a common freely rotatable shaft 105 in a manner such that the spacing between the two discs can be adjusted to enclose and protect against the flames 85, plants of various sizes. More particularly, the disc 101 has a fixed axial position with respect to the bearings 107 which rotatably supports the shaft 105 while the other disc 103 is pressed against a lock nut 109 by a compression spring 111; the lock nut can be axially adjusted along the threaded part of the shaft 105. Preferably, the outer edge of each disc 101, 103 has an inwardly directed and inclined flange 113 which limits soil penetration of the discs 101, 103. For certain types of crops, such as carrots, the soil in which the plants are planted is very loose and therefore the protector wheel must be either lightweight or properly counter-balanced so as to exert only slight pressure on the soil while certain other types of plants, such as corn, the protector wheels may be heavier since the soil is rather hard.

Figure 4:
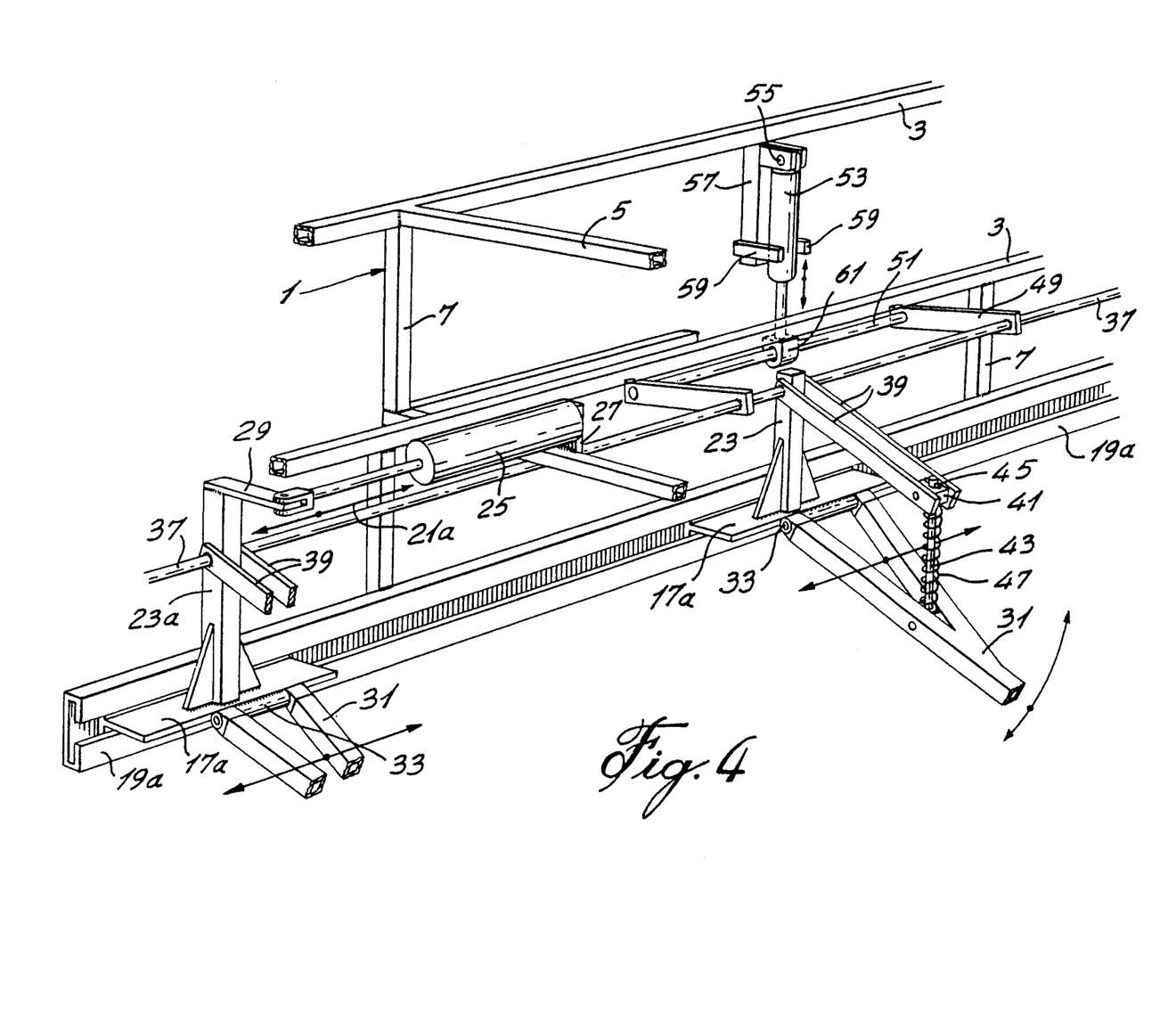
FIG. 4 is a partial perspective view of an alternate embodiment.

FIG. 4 shows another embodiment of the system for laterally shifting the earth working tools such as the discs 35 and the idle wheels while including also the system for raising such implements. Compared to FIG. 3, the only difference is the reversal of parts used for the lateral shifting of the swing arms 31 or 31A. Instead of using a continuous tool bar 17 extending substantially the entire width of the machine, in conjunction with separate guide members 19, separate tool bar sections 17A of T-shape cross-section are guided by and transversely displaceable within a continuous guide member 19A of C-shape cross-section, this guide member being fixed to the frame 1 of the machine. There is a tool bar section 17a associated with each swing arm 31 or 31A, the latter being hinged to the tool bar section 17A by a hinge 33. The mechanism for laterally shifting the several tool bar sections 17A within the continuous guide member 19A is the same as in FIG. 3 and includes a horizontal double-acting ram 25 reacting against the frame 1 and against a post 23A which is fixed to and upstands from one of the tool bar sections 17A. The remaining drag members 17A are in turn laterally shifted simultaneously with the one carrying the post 23A through the rotatable rod 37 as indicated by double arrow 21A. One or the other of the two lifting crank arms 39 is pushed by the rod 37 on the post 23 which in turn displace the associated tool bar sections 17A.

The swing arm raising mechanism is the same as described in FIG. 3, including the vertical hydraulic ram 53 raising or lowering the actuator rod 51 through collar 61, said actuator rod causing rotation of the rotatable rod 37 through actuating crank arms 49.

It will be noted that the machine of the character described can be equipped with a seeding equipment and/or other types of earth working equipment instead of the weeding systems described. In all cases very precise guidance of the implements is obtained due to the fact that their implements can be laterally shifted with respect to the machine frame to compensate for lateral deviations of the rows of crop plants.

Also, the plant protector wheels of the present invention enable thermal weeding up to a very short distance from the plants on each side thereof without in any way damaging these plants either by heat or by non-intended soil displacement.

I claim:

1. An agricultural machine for moving in a direction of travel comprising: a frame; ground engaging means, frame support members depending from and preventing transverse movement of said frame relative to said direction of travel; a transverse row of earth working implements carried by said frame by a series tool bar sections movably guided by and retained in a transverse guide rail fixed to said frame; a transverse bar interconnecting said tool bar sections at a predetermined distance apart; each of said implements attached to and rearwardly depending from one side of said tool bar sections; and powered, double-acting actuator means on said frame to selectively shift said transverse bar and therefore the row of implements transversely.

2. An agricultural machine for moving in a direction of travel comprising: a frame; ground engaging, frame support members depending from and preventing transverse movement of said frame relative to said direction of travel; a transverse tool bar carried and guided by a plurality of guides fixed to said frame for transverse shifting on said frame; a powered double-acting actuator means on said frame for shifting said tool bar transversely with respect to the direction of travel; a transverse row of longitudinally extending swing arms having front and rear ends, each said swing arm being pivotally connected by their front end to said tool bar for up and down pivoting movement; each said swing arm carrying an earth working implement on their rear end; power operated lifting means to simultaneously raise and lower said implements relative to said frame; said lifting means including: a rotatable bar extending parallel to and above said tool bar, a plurality of upstanding posts fixed to said tool bar and rotatably carrying said rotatable bar, a lifting crank arm for each implement extending over a respective swing arm and having an inner and outer end, said inner end being non-rotatably fixed to said rotatable bar for rotation of said lifting crank arm in a vertical plane, a link interconnecting the outer end of said crank arm to said swing arm, and power operated means to rotate said rotatable bar.

3. An agricultural machine as defined in claim 2, wherein said power operated means includes a pair of actuator crank arms fixed to said rotatable bar and spaced from each other along said rotatable bar; an actuator rod carried by the outer ends of said pair of actuator crank arms and parallel to said rotatable bar; a double-acting hydraulic ram vertically carried by said frame and having a piston rod; and a collar fixed to said piston rod which slides on said actuator rod.

4. An agricultural machine for moving in a direction of travel comprising a frame; ground engaging, frame support members depending from and preventing movement of said frame transversely of said direction of travel, a transverse row of earth working implements carried by said frame for movement in said direction of travel and also transversely shiftable together relative to said frame for lateral right or left shifting, powered, double-acting actuator means on said frame to shift said row of implements, wherein each earth working implement includes a longitudinally extending swing arm, an idle wheel freely rotatably mounted on the rear end of said swing arm and having two peripherally circular concentric marginal portions transversely spaced from each other for rotating on each side of row crop plants and flame-throwing nozzles carried by said swing arm on each side of said wheel to direct a flame towards the earth in zones on each side of said wheel and burn the weeds in said zones while the crop plants are protected from said flame by said marginal portions of said wheel.

5. An agricultural machine as defined in claim 4, wherein said wheel has a rim which is transversely U-shaped and forms an outwardly opening groove receiving said plants while said rim contacts the earth on each side of said plants.

6. An agricultural machine as defined in claim 4, further including means to adjust the spacing between the two marginal portions in accordance with the plants size.

7. An agricultural machine as defined in claim 4, further including an inclined flange radially inwardly directed from each marginal portion to limit earth penetration of said marginal portions.

8. An agricultural machine as defined in claim 4, wherein each marginal portion is part of a separate member carried by a common wheel shaft, each marginal portion having an outwardly directed cylindrical flange, each said flange having a portion adapted to rest on the earth as said wheel rotates, said flame being directed unto said flange portion which is heated by said flame but which prevents direct action of said flame on said earth.

9. An agricultural machine as defined in claim 4, further including a pair of crop plant deflector plates carried by said swing arm on each side of said wheel and ahead of the same, said plates laterally forwardly flaring from a rear portion extending within the space between said two marginal portions.

10. An agricultural machine as defined in claim 8, further including heat insulating means on the inside of said members.

11. A row crop weeding machine comprising:
a) a frame adapted to be pulled in a direction of travel along and over a predetermined number of spaced rows of crop plants, said frame having a front hitch for free pivotal connection to a farm tractor;
b) ground engaging means carried by said frame for supporting said frame over said plants and for preventing transverse movement relative to said direction of travel of said frame during movement of said frame in said direction of travel;
c) a pair of parallel, longitudinally spaced tool bars extending transverse of said direction of travel;
d) a pair of guide means secured to said frame, one for each tool bar, to guide said tool bars in a shifting movement on said frame transverse to said direction of travel;
e) a plurality of transversely spaced swing arms, extending rearwardly from each tool bar, each swing arm having a front end and a rear end, said front end pivotally connected to a respective tool bar for up and down movement of said swing arm independently of the other swing arms;
f) a weeding implement carried by the rear end of each swing arm, the swing arms being spaced transversely from each other a distance adjusted to be the distance between adjacent rows of crop plants, the implements carried by the swing arms of one tool bar adapted to be positioned on one side of the plants and the implements carried by swing arms of the other tool bar adapted to be positioned on the other side of said plants; and g) a pair of powered, double-acting actuator means, one for each tool bar, on said frame for transverse shifting of said tool bars independently of each other.

12. A row crop weeding machine as defined in claim 11, further including, for the implements of each tool bar, power operated lifting means to simultaneously raise and lower said implements relative to said frame, said power operated lifting means including a crank arm for each implement having an inner end and an outer end, each crank arm extending over a respective swing arm, a link interconnecting the outer end of said crank arm to said swing arm, a rotatable bar extending across and secured to each crank arm for rotation of said crank arms in a vertical plane and a double-acting ram to rotate said rotatable bar.

13. A machine as defined in claim 12, wherein said link has a sliding connection with said crank arm and further including a compression spring surrounding said link and downwardly biasing said swing arm and implement.

* * * * *